Oct. 27, 1936.　　　　V. K. FRY　　　　2,058,678
FLYING MACHINE
Filed April 29, 1933　　　2 Sheets-Sheet 2
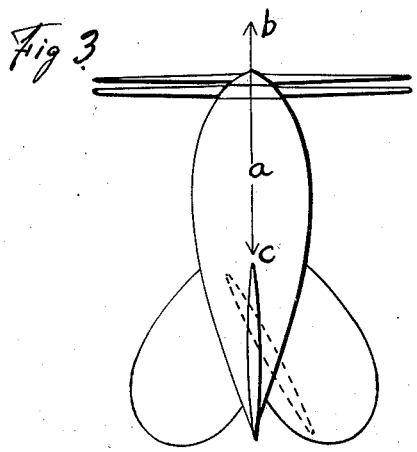
Fig. 3
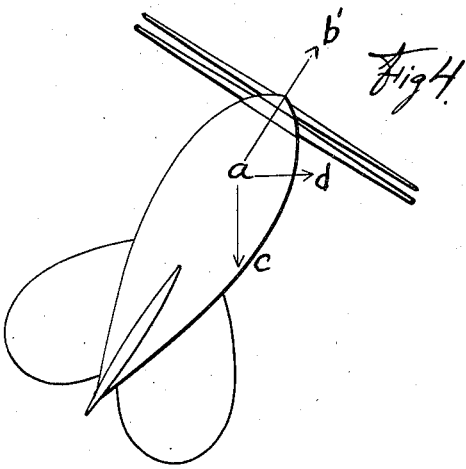
Fig. 4
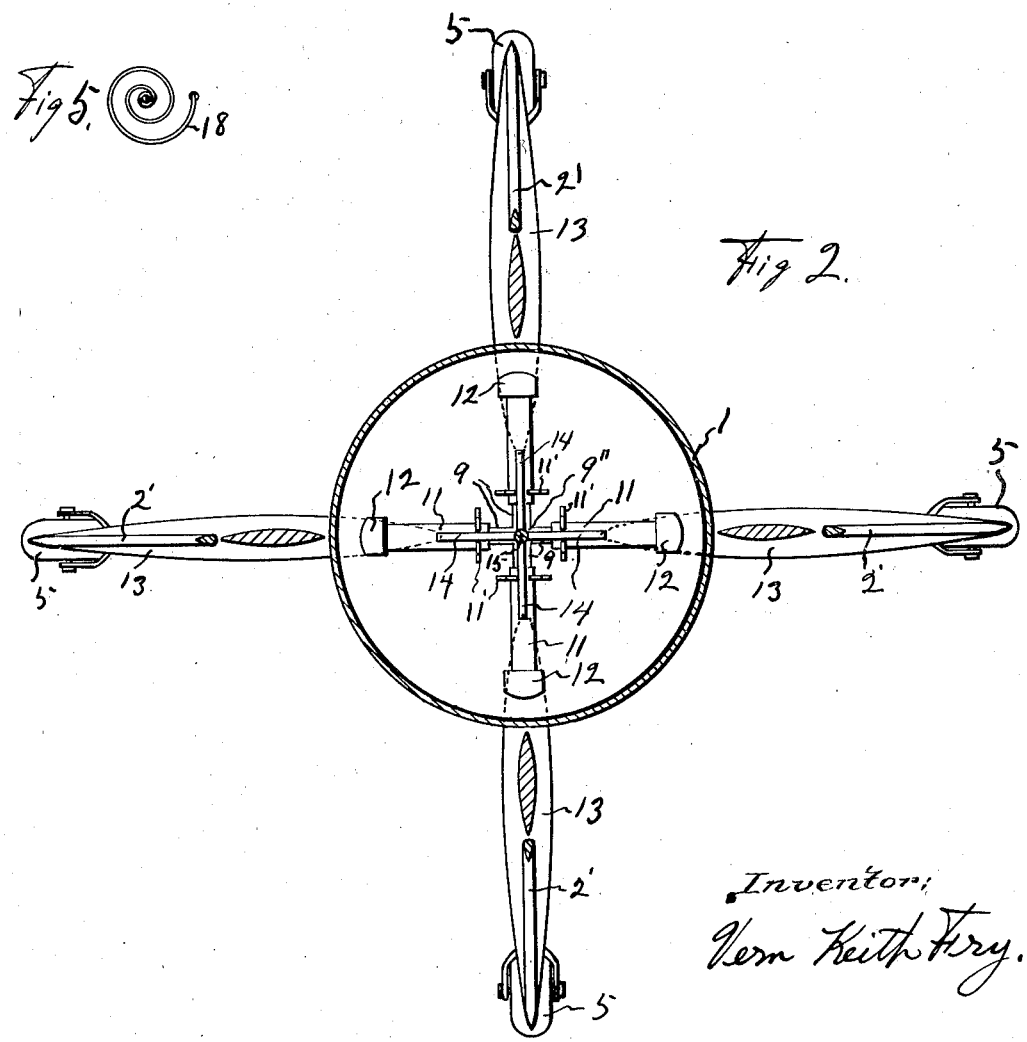
Fig. 5
Fig. 2.
Inventor;
Vern Keith Fry.

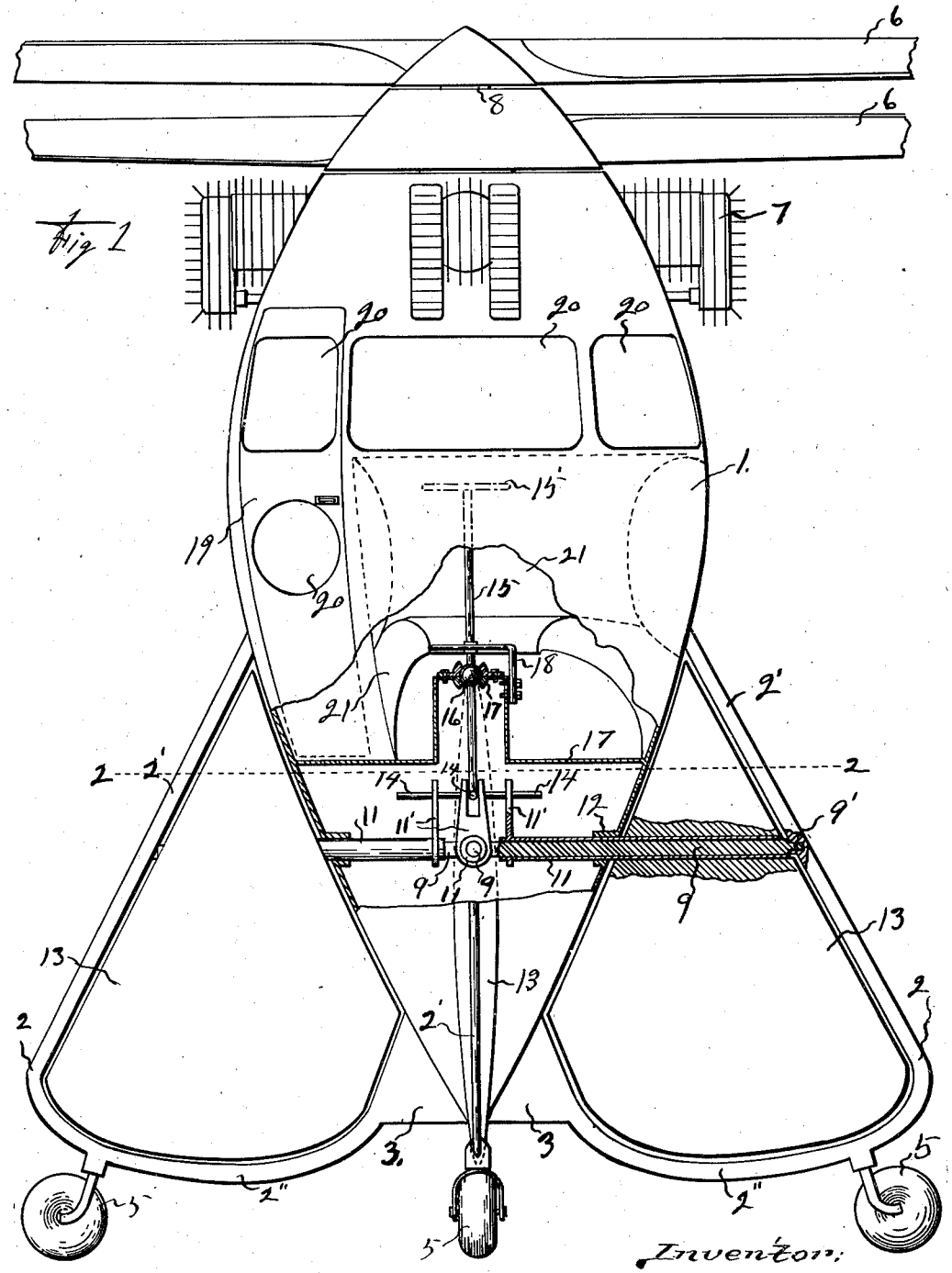

Patented Oct. 27, 1936

2,058,678

UNITED STATES PATENT OFFICE 2,058,678

FLYING MACHINE

Vern Keith Fry, Noble Township, Cass County, Ind.

Application April 29, 1933, Serial No. 668,579

7 Claims. (Cl. 244—19)

My invention relates generally to heavier-than-air airships and particularly to the class designed to ascend and descend vertically if desired and deriving their lifting force chiefly or entirely from revolving propellers or revolving wings rather than from wings fixed to the fuselage.

The nature of my invention is of a fuselage mounted vertically on legs, pontoons or wheels, in this case the latter. On the lower part of the fuselage, rudders are swiveled. Propellers or revolving wings are mounted on the top or nose part of the fuselage and rotate in planes at right angles to the longer axis of the fuselage.

The purpose of my invention is to provide a lifting force for vertical ascent and descent and means to convert any desired part of this force to a horizontal force for lateral movement.

A further purpose is to provide means for moving the fuselage about any axis in the plane of propeller rotation and means to rotate the fuselage on its longer axis, a part of said means being a common control shaft.

Another purpose of the invention in locating the fuselage in the propeller slip stream with its longer axis parallel to the direction of the slip stream is to reduce air resistance and to make the rudders effective when the craft is motionless in the air.

I will describe the invention more in detail as follows,

Figure 1 is a side elevation with parts broken away to show interior mechanism.

Figure 2 is a cross section on the line 2—2 of Figure 1.

Figures 3 and 4 are diagrammatical views showing the system of controls and the principle of flight.

Figure 5 is an elevation of the control neutralizing spring.

The invention consists of a fuselage 1 mounted in an upright or nearly upright position, on a landing gear. The landing gear consists of three or more brackets, 2, in this case four, each bracket being comprised of a strut 2' extending out and down from about half way up the side of the fuselage 1 and joining a strut 2" which extends horizontally from the lower extremity of the fuselage 1. At the outer extremity of the brackets 4 pneumatic castor wheels 5 are hung to receive landing shocks and for the purpose of taxying the craft on the ground.

At the top or nose of the fuselage two or more propellers 6, or revolving wings, are mounted to rotate in planes at or nearly at right angles to the longer axis of the fuselage. The propellers 6 are mounted on and are rotated by the power plant 7 having a common axis but rotating in opposite directions, thereby tending to reduce motor torque on the fuselage. The power plant 7 in turn is mounted in the nose of the fuselage, the longer axis of the fuselage coinciding or nearly coinciding with the axis of the power shaft 8 of the power plant 7. The bevel of the propeller blades is such as to force a slip stream of air down past the fuselage 1 on every side. Thus a powerful force is exerted on the ship in the direction of the nose or top part of the fuselage 1 which raises the craft vertically.

Near the lower extremity of the fuselage 1 four transverse shafts 9 unite in the center of the fuselage forming the cross 9". The shafts 9 extend out horizontally through sleeves 11 and are located at their outer ends by means of a tenon 9', formed by a smaller extension of the shaft 9, fitting into a mortice in the strut 2'. The sleeves 11 are telescoped over the shafts 9 and are revolvably mounted thereon. The sleeves 11 also extend through the journal boxes 12, formed in the side of the fuselage 1, and are rotatably mounted therein.

The part of the sleeves 11 between the journal boxes 12 and the struts 2 extends edgewise through the rudders 13 and are attached, fixed in respect thereto for the purpose of swiveling the rudders on the axes of the shafts 9, and are movable by means of the sleeves 11.

On the inner end of the sleeves 11 are the cranks 11' fixed thereto. The outer ends of the cranks 11' are forked and adapted to receive shafts 14 in the fork. The shafts 14 converge at the longer axis of the fuselage and unite fixedly and integrally with the lower end of the control shaft 15. A distance up from the lower end of the control shaft 15 a ball 16 is formed. The ball 16 is movably located in a socket 17' and socket cap 17" formed at the center of a diaphragm 17 across the fuselage 1. The control shaft 15 extends up a distance from the ball and socket joint and is fitted at its top end with a hand-wheel 15' fixed in respect thereto.

It will readily be seen from this arrangement that the control shafts 15 may be rotated or inclined in any direction by means of the hand wheel 15 for the purpose of moving the cranks 11' thereby rotating the sleeves 11 and changing the position of the rudders fixed thereto for steering purposes.

It will be noted that the rudders 13 are in this case mounted within the outline of the landing gear brackets 2 for the purpose of diminishing air resistance, however these units may be constructed separately without changing the spirit of the invention.

A coil spring 18 is attached at the inner end of its coil, fixed in respect thereto to the control shaft 15 just above the ball and socket joint 16—17. The outer end of the coil spring is attached to the diaphragm or floor of the fuselage. The purpose of this spring 18 is to return any rotary or tilting movement of the control shaft back to a neutral position when the hand wheel is released.

The effect of rotating the control shaft 15 in either direction is to revolve the shafts 14 and the cranks 11' all in the same circular direction which in turn rotates the lower edges of the rudders 13 all in the opposite circular direction about the vertical axis of the fuselage 1. The air of the propeller slip stream acting on the inclined surfaces of the rudders 13 cause the craft to rotate in a direction opposite the rudder inclinations which was the direction of the control shaft rotation which was the desired result.

The advantage of ability to rotate the craft about its longer axis is to enable the pilot to face the direction of travel or to counteract rotation resulting from motor torque. However ordinarily it is proposed to use power plants which neutralize torque.

By studying the effect of inclining the control shaft, as regards the long axis of the ship, one direction or another, it will be noted that adjacent pairs of rudders 13 are acted upon the same but the direction of inclination is opposite that of the control shaft. The slip stream air acting against the inclined surfaces of the pair of rudders 13 force the tail of the ship in the opposite direction which is to incline the craft the same as the control shaft was inclined and produces the required result. Furthermore it will be seen that if the control shaft 15 is inclined in the direction of any one rudder that rudder and its adjacent rudder are not affected but the shafts 14 move axially through the forks of the cranks 11' freely. If on the other hand the control shaft 15 is inclined toward a line between two rudders the two rudders and their oppositely disposed mates are acted upon oppositely.

It will be noted that the compensating type of rudder is shown in this instance but it is not deemed essential to use this particular type.

Referring to Figure 3 the ship is in the process of vertical flight. The force a—b produced by the propellers exceeds the force a—c or gravitational force consequently the direction of flight is up.

But, still referring to Figure 3, suppose the nearest rudder, the one viewed edge-on and the rudder oppositely disposed to it are inclined as shown by the broken lines.

Then the effect of the slip stream on the inclined rudders is to force the ship to take the position of inclination to the vertical as shown in Figure 4. The force a—b is also changed and is inclined to the right of the vertical and referring to Figure 4 is a—b'. But force a—c remains vertical and is not in the opposite direction to force a—b' hence the resulting horizontal force to the right a—d, Figure 4, propelling the ship horizontally.

It is understood that there is no danger of the inclined rudders producing air disturbances causing the air to bank back against the propellers on one side of the ship, since air is quite compressible and the air velocity in the slip stream is high. Furthermore the rudders are considerable distance from the propellers allowing banks to disperse laterally.

The diaphragm 17 across the fuselage 1 forms the floor of a passenger compartment while the walls are formed by the sides of the fuselage. The top or ceiling of the compartment is formed by the lower side of the motor making the motor readily accessible for adjustment.

A door 19 in the side of the compartment wall is provided for pilot and passengers entering or leaving.

Windows 10 are cut in the compartment walls and door for light, ventilation and visibility.

An upholstered seat is provided conveniently situated in respect to the control wheel 15'.

A pronounced widening in a vertical direction of the struts 3 at the ends attaching to the fuselage forms stabilizers 3'.

I now proceed to claim as my invention as follows:

1. A flying machine comprising a fuselage, its longer axis in a vertical position, a landing gear composed of landing sections said sections made up of a downward and outward member fixed to the side of the said fuselage and fixed at the outer end to a horizontal member said horizontal member attached to the lower side of said fuselage and an earth contact member fixed under said members at or near the union of said members, rudders installed in inclosure formed by the fuselage and landing gear members, a common means for swinging said rudders on horizontal hinges in unison in a clockwise or anticlockwise direction in respect to the vertical axis of said fuselage or for swinging pairs of rudders oppositely disposed in the same plane for altering the position of the craft and direction of flight, a power plant installed in the fuselage and propellers mounted thereon and driven by said power plant, means to counteract tendencies of the craft to rotate on its vertical axis as a result of motor torque.

2. A flying machine comprising a body having conically shaped ends, revolving wings mounted on one end of the body and drivingly connected to a prime mover, rudders hinged about the other end of the body and in the air stream of the revolving wings and acted upon by said air stream, common means for operating said rudders in unison in the same circumferential direction about the axis of said body or in pairs in the same plane said means comprising a control shaft a hand wheel fixed at one end, shafts fixed at the other end at right angles to the control shaft and extending toward each rudder, said control shaft pivoted between the ends in a cross floor in said body by means of a ball and socket joint, and free to rotate or swivel therein, secondary shafts extending radially from the body axis through the body walls and locating in the landing gear member by means of a mortice and tenon, third shafts rotatably mounted on secondary shafts and extending through said rudders and fixed in respect thereto for the purpose of swinging the rudders when said third shafts are rotated, crank arms fixed to third shafts and having forked outer ends said forks receiving first shafts loosely therein and adapted to be revolved thereby when first shafts are revolved or swung laterally, and unmoved by axial swinging of first shafts, said revolving of first shafts swinging all rudders in the same circular directions, said lateral swinging of said first shafts swinging oppositely disposed rudders in the same plane, means for counteracting tendencies of the craft to rotate on its vertical axis as a result of motor torque, said means comprising vertical rudders hinged to horizontal shafts said shafts radiating from the vertical axis of the body, actuating means operable by control members for swinging said rudders in the same clockwise or anticlockwise direction in respect to the vertical axis of the said body and setting up tendencies to rotate the craft counter to the motor torque produced rotational tendencies.

3. A flying machine comprising a vertical body, a landing gear supporting said fuselage vertically, propellers rotating in horizontal planes, a power plant drivingly connected to said propellers, vertical rudders pivoted on horizontal shafts within and acted upon by propeller air stream, control members connected with said rudders, a rotary and pivotally movable control shaft, actuating means operable by the rotation of the control shaft to swing said rudders in unison toward the same clockwise or anticlockwise direction around the vertical axis of the fuselage as means of rotating the craft, and actuating means operable by the swinging movement of the shaft to swing said rudders in oppositely disposed pairs in the same plane of inclination to the vertical as means of tilting the craft, stabilizing fins on the side of the body and fixed in respect thereto, and means for returning the control shaft to a neutral position when released.

4. An airship comprising a landing gear, a vertical body supported thereon, a power plant installed in body, propellers mounted thereon exerting a vertical force up, vertical rudders pivoted on horizontal shafts, said shafts radiating from the vertical axis of the body, means for swinging said rudders on their pivots, said means comprising a sleeve rotatably mounted on said horizontal shafts and fixed in respect to the rudders, an arm, at right angles to said sleeve and fixed thereto, said arm operably connected to revolving and swinging second shafts by journaling said second shafts loosely and axially movable therein, a control shaft rotatably and swingingly mounted by means of a ball and socket joint between the ends, said second shafts fixed to one end of the control shaft, a hand wheel fixed to the other end of the control-shaft for rotating said shaft, actuating means operable by the rotation of the control-shaft to swing said rudders in unison toward the same circular direction about the longer axis of the fuselage, actuating means operable by the tilting of the control shaft to swing pairs of said rudders simultaneously in the same plane of inclination to the axis of the said fuselage, means for returning the control shaft to a neutral position when released said means comprising a spiral spring attached at its inner end to the control shaft fixed in respect thereto and attached at its outer end to the floor of the fuselage.

5. A vertical flying machine composed of propelling members ordinarily revolving in horizontal planes, a power plant drivingly connected to said propelling members and attached to an elongated body, said body being streamlined and located parallel as to direction of and within the propeller slipstream, brackets attached to opposite sides of lower part of said body, shock absorbing and locomotive facilitating terrestial contact members hung from the outer ends of said brackets, means for changing the plane of rotation of said propelling members, said means comprising vertical rudders swiveled to the sides of said body on horizontal shafts and within the propeller slipstream, means to swing pairs of diametrically opposed rudders in the same direction to the exclusion of other rudders to alter the direction of flight, a common means to rotate the machine on its vertical axis and equalize motor torque, said means comprising means to swing all the rudders toward the same circumferential direction about the longer axis of said body to affect a screw propeller functioning in the propeller slipstream, common control members to produce varied combinations of rudder movement, a common means for automatically returning variously inclined rudders to neutral positions when controls are released.

6. The combination in a flying machine of a vertically mounted body, oppositely rotating propellers mounted on the top of said body and the swirl neutralized propeller slipstream flowing down over said body, a plurality of vertical rudders swung on the lower end of said body in planes inclined to each other not more than 120 degrees, said rudders within and acted upon by the propeller slipstream, actuating means operable by control members to move said rudders simultaneously in the same clockwise or anticlockwise direction in respect to the vertical body axis as means of effecting rotation of the machine and counteracting torque, actuating means operable by control members to swing oppositely disposed rudders uniformly or variably as desired in the same direction to tilt the craft, means to automatically return the rudders to a neutral position when the control shaft is released said means comprising a spring fixed to the control shaft a distance from the swivel joint and coiled around the control shaft axis and fixed at the outer end to the body of the machine.

7. In a vehicle moving in a surrounding element, control surfaces swung parallel to the direction of flow of the surrounding element and on hinge axes transverse to said direction of element flow, said hinge-axes inclined to each other 120 degrees or less, a common means to swing said control surfaces in arcs in size directly proportional to the angle of inclination of the said hinge axes to the plane of control member swing and in a direction inclined to the direction of control member swing inversely proportional as the control surface hinge axes inclines to the direction of control member swing and to swing all the control surfaces in the same direction in respect to the center of the vehicle simultaneous with and in addition to any other combination of control surface movement, said means comprising a control shaft with a hand wheel affixed thereto and swiveled in the framework of the vehicle free to swing and rotate therein, second shafts attached transverse to the control shaft and fixed in respect thereto and adapted to be swung thereby, arms fixed in respect to the control surfaces and extending a distance transverse to the control surface hinge axes, said arms operably engaging the second shafts in respect to lateral movement of the second shafts but unengaging radial movement thereof.

VERN KEITH FRY.